United States Patent [19]

Jasinski et al.

[11] 4,070,627
[45] Jan. 24, 1978

[54] DOUBLE TUNED INPUT CIRCUIT FOR TELEVISION TRANSMITTER AMPLIFIER

[75] Inventors: Joseph Richard Jasinski, Shillington, Pa.; James Bruce Pickard, Quincy, Ill.; Claude Edward Doner, New Providence, Pa.

[73] Assignee: RCA Corporation, New York, N.Y.

[21] Appl. No.: 692,547

[22] Filed: June 3, 1976

[51] Int. Cl.² .......................... H04B 1/04; H04N 5/14; H04N 5/38; H03F 3/60
[52] U.S. Cl. .................................... 325/127; 358/184; 358/186; 330/56
[58] Field of Search ............................. 325/125, 131; 179/170 HF, 170 D; 358/186, 184; 330/56, 45; 333/76, 82 B, 83 R

[56]  References Cited
U.S. PATENT DOCUMENTS 2,706,802  4/1955  Meisenhermer et al. ......... 333/56 X
2,710,894  6/1955  Gluyas, Jr. ..................... 330/56
3,124,764  3/1964  Stearns ........................... 330/56 X
3,842,361  10/1974  Quirk ............................. 333/83 R X
3,904,995  9/1975  Phillips ........................... 330/56 X Primary Examiner—Robert L. Griffin
Assistant Examiner—Aristotelis M. Psitos
Attorney, Agent, or Firm—Eugene M. Whitacre; Paul J. Rasmussen; Robert L. Troike

[57]  ABSTRACT

A substantially constant impedance is developed across the input terminals of a linear amplifier used in a very high frequency (VHF) low band television transmitter. The input circuit consists of lumped components arranged in a capacitively coupled double tuned configuration. A relatively long coaxial transmission line system is used to connect the input circuit to the terminals of the tube. The coaxial line system and input circuit tunes across the entire VHF low band of 54 to 88 MHz. An input voltage standing wave ratio (VSWR) equal to or less than 1.2:1 is achieved over each six MHz channel.

4 Claims, 3 Drawing Figures

DOUBLE TUNED INPUT CIRCUIT FOR TELEVISION TRANSMITTER AMPLIFIER

BACKGROUND OF THE INVENTION

1. Field of the Invention

This invention relates to an input circuit for a linear amplifier used in a very high frequency low band television transmitter and more particularly to a lumped component input circuit for the amplifier which in combination with a coaxial extension gives a substantially constant impedance across the entire low band.

2. Description of the Prior Art

In a VHF television transmitter operating in the low band, viz., 54 to 88 MHz band, it is desirable that the linear amplifier which is typically the final stage be coupled to the prior stage through an input circuit which will give a substantially constant impedance across the selected channel. Such a constant impedance can be obtained through the design of a double tuned lumped component circuit. In certain applications, it is advantageous to position the final power amplifier tube such that it can be removed and replaced easily from the transmitting equipment for maintenance purposes. Heretofore, such power amplifier tubes were positioned such that the associated input and output circuit connections did not provide a serious hindrance to accessibility. In certain applications, however, the operating conditions and environments of a selected power tube may require that the input circuit to such a tube be positioned at a location that must be physically more remote from the tube that conventional design of the input circuit would provide.

SUMMARY OF THE INVENTION

A lumped component input circuit, in combination with a coaxial extension is provided for a linear amplifier tube of a VHF low band television transmitter. Primary and secondary tuned circuits are over-coupled through capacitive means. Coaxial means are provided to couple the input terminals of the tube to the lumped component input circuit. The combination of the coaxial means with the tube is such that at all frequencies in the 54 to 88 MHz band of the transmitter, the coaxial means has an electrical length of greater than a quarter wavelength ($>\lambda/4$) but less than a half wavelength ($<\lambda/2$).

DESCRIPTION OF THE PREFERRED EMBODIMENT

A low band VHF television transmitter operates in the frequency range of 54 to 88 MHz. Within that frequency range there are assigned five television channels, namely, channels two through six. Each channel occupies a 6 MHz instantaneous bandwidth. For example, channel two occupies the band from 54 to 60 MHz. Further information as to the frequency band occupied by each of the other channels can be obtained from the ITT "Reference Data for Radio Engineers," Fifth Edition, pages 28-9 et seq.

Figure 1:
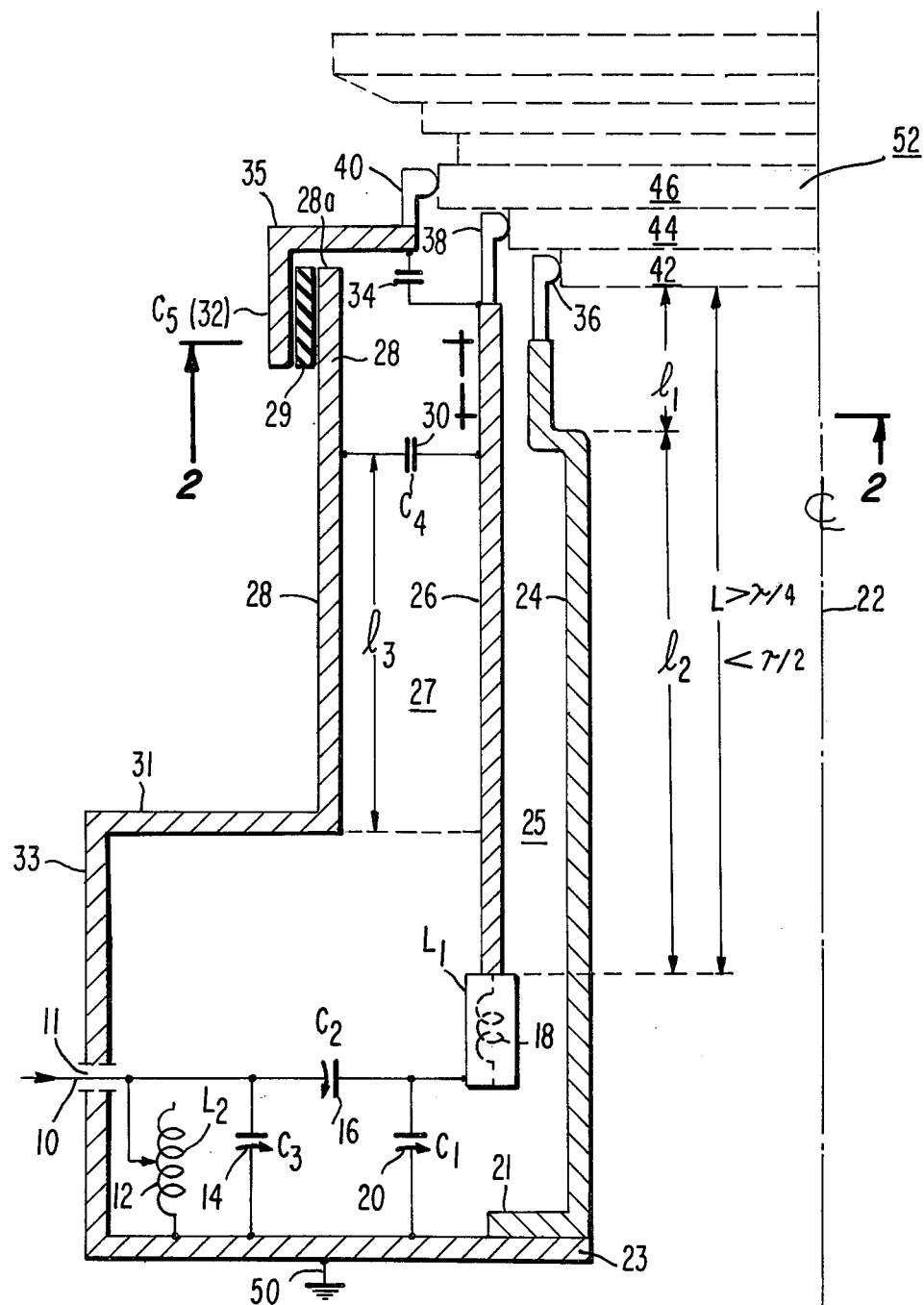
FIG. 1 is a schematic diagram of the input circuit to a power amplifier tube according to the present invention.

Referring to FIG. 1, there is shown a diagram of the input circuit to the power amplifier of the low band VHF transmitter of the present invention. The input circuit including a coaxial extension to the tube transforms the finite input admittance (to be described) of the linear amplifier tube to a 50 ohm drive point impedance as seen at input line 10. The input VSWR is equal to or less than 1.2:1 over any 6 MHz channel. In this embodiment, the power tube 52 is a tetrode RCA 8916 (RCA Corporation) represented by its cathode 42, control grid 44, and screen grid 46 and their associated terminals in the form of contacts 36, 38, and 40, respectively. To develop 25 kilowatts and operate the tube within the manufacturer's ratings, the input circuit is adjusted as will be described to present 50 ohms across input terminal 10 and ground 50 to the preceding stage over the 6 MHz bandwidth associated with the selected one of the five channels in the 54 to 88 MHz band.

Lumped inductor 12 ($L_2$) and variable capacitor 14 ($C_3$) form a parallel resonant circuit which is designated as the primary tuned circuit. Lumped inductor 18 ($L_1$) and variable capacitor 20 ($C_1$) in combination with the transformed interelectrode finite admittance existing across the input (cathode 42 and control grid 44) terminals of tube 52 also forms a tuned circuit which is designated as the secondary tuned circuit. Inductor $L_1$ is a metal strap which is represented by a lumped circuit component designated as 18 of FIG. 1. The primary and secondary tuned circuits are coupled to each other through variable capacitor 16 ($C_2$). The range of capacitance of variable capacitor 16 is chosen such that at all frequencies in the 54 to 88 MHz band, the coupling between the primary and secondary tuned circuits can be adjusted to exceed critical coupling. The response curve of the double tuned input therefore exhibits the classic double peaks associated with over-coupling. The primary tuned circuit is designed such that it is resonant above the center frequency of the six MHz instantaneous bandwidth associated with each channel, whereas the secondary tuned circuit is resonant below the center frequency. At all frequencies in the 54 to 88 MHz band, the effective Q (Qeff) of the double tuned input circuit is greater then two. Note that Qeff as used herein is equal to the mid frequency (fo) of each channel divided by the three db double-tuned bandwidth.

According to the invention, the lumped component input circuit comprising inductors 12 and 18 and capacitors 14, 16, and 20 must be located at a position that is remote from and thereby physically separated a significant distance from contacts 36, 38, and 40 of the tube. Connection of the circuit to these contacts is accomplished according to the invention by a coaxial transmission line system.

The coaxial line transmission system is formed of a plurality of concentric members 24, 26, and 28, each member being metallic. Members 24 and 26 are circular in cross section while member 28 is rectangular or preferably square in cross section. Members 24 and 26 define a coaxial transmission line cavity 25 while members 26 and 28 define the coaxial transmission line cavity 27. Coaxial member 24 is coupled at one end through contact 36 to the cathode of tube 52, and is also supported at its other end by a flange 21 which, in turn, is affixed to base member 23. In turn, base member 23 is connected to ground 50. Member 26 is coupled through contact 38 to the control grid 44. The member 26 is suitably suspended between members 24 and 28, the free end of which member terminating in the inductor $L_1$. Member 28 is rigidly supported by the upper wall 31 of the housing which is integral with the base member 23. An aperture 11 in the side wall 33 of the housing affords access for the input line 10.

Member 28 extends upwardly in a concentric manner terminating with an end 28a. A capacitor ($C_5$) is formed on the outer surface of member 28 by positioning an insulator tape 29 such as Teflon on the peripheral portion of the member. A hooded member 35 is disposed over and about member 28 to provide the second metallic conductor plate for capacitor $C_5$, the first metallic conductor plate being provided by the upper portion of member 28 in register with the insulator tape 29. Hooded member 35 is suitably connected to contact 40, which, in turn, is in conductive relation with the screen grid 46 of tube 52.

The capacitor $C_5$ formed by the metallic members 35 and 28 and the dielectric 29 should preferably be free of air gaps. Accordingly, a suitable adhesive backed conductive tape such as aluminum metallic foil is affixed over tape 29 to avoid any air gaps being formed in this space. The foil is schematically part of member 35 in FIG. 1.

Capacitor 34, connected across contacts 38 and 40, is preferably formed by the combination of eight disc capacitors each having preferably a value of 0.0022 microfarads with a rating of six kilovolts dc, having thus a total capacitance of 0.0176 microfarads. The disc capacitors are suitably positioned in the cavity 27 adjacent contacts 38 and 40. As so connected capacitor 34 is in shunt relative to the tube terminals 44 and 46 and serves to bypass the control grid 44 to the screen grid 46. The tube is operated in the RF grounded grid configuration. As indicated above, lumped inductor $L_1$ is connected to line 26 and to the common connection of capacitors $C_1$ (20) and $C_2$ (16). The formation of capacitor $C_4$ (30) is described below.

Figure 2:
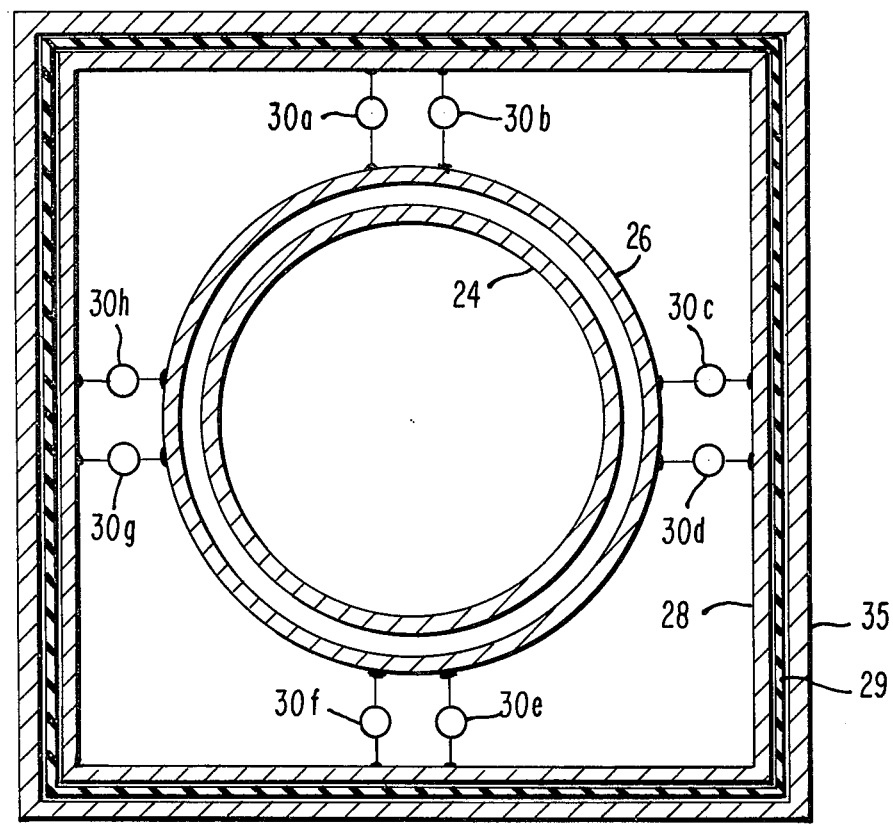
FIG. 2 is a cross-sectional view taken in plane 2—2 of FIG. 1.

Referring to FIG. 2 there is shown the cross sectional view taken in plane 2—2 of the transmission line system. For purposes of simplicity screen grid contact 40 has been omitted.

Capacitor $C_4$ (30 of FIG. 1) is formed from a plurality of disc capacitors, 30a through 30h, mounted in the narrow space defined by the gap between the outer rectangular coaxial member 28 and the cylindrical member 26. The disc capacitors are connected to the respective members 26 and 28 such as to provide the equivalent total capacitance $C_4$ connected into the coaxial line as shown schematically.

As stated previously, the input terminals of the tube are capacitive. The surge impedance of the input coaxial line 25 was chosen such that the same type of circuit elements and circuit configuration can be utilized over the entire 54 to 88 MHz band and thereby minimize the change in components that would be needed to adapt a common amplifier for a plurality of television channel uses. At every frequency in the band, the coaxial line whose physical length is designated as L has in combination with the tube an electrical length which is always greater than a quarter wavelength ($>\lambda/4$) but less than a half wavelength ($<\lambda/2$). The physical length of the coaxial line is measured from cathode contact 36 to inductor 18. This length of coaxial line in combination with the lumped components of the input circuit insures that all frequencies in the desired band present a substantially constant impedance e.g., 50 ohms, as seen across the input terminal 10 and ground 50 of the circuit of FIG. 1.

It has been discovered that an input circuit having a VSWR no greater than 1.2:1 will provide an impedance match for each channel that can be maintained as a function of brightness and frequency. VSWR as is well known in the art is a measure, indirectly, of the degree of impedance mismatch. As the brightness which represents picture information shifts in voltage level the dynamic impedance of the tube 52 shifts, thereby producing a shift in the impedance match. As the frequency of the signal shifts in the 6 MHz band associated with each channel, the reactive components also shift thereby producing a shift in the impedance match. Heretofore, a value of 1.3 to 1.4:1 for VSWR of a single tuned input circuit was considered acceptable for television transmitter amplifiers. It will be appreciated that a VSWR of less than or equal to 1.2:1 insures that the desired impedance match will be maintained for each channel as a function of both brightness and frequency.

According to the invention, this VSWR value of 1.2:1 or less is achieved for each of the five television channels using the same circuit configuration for each channel.

As described above, the invention provides for the same circuit configuration to be used for all five television channels located in the 54 to 88 MHz band. However, the values of each of the lumped components 12, 14, 16, 18, and 20 are changed for each selected channel of the five channels in the low VHF band. For inductor 18 the changing of the component values requires the removal of one inductor and its replacement by another. For the capacitors 14, 16, and 20, the change of value requires that the same capacitor be adjusted to the required capacitance. Typical values determined by computer-aided computations for each of the lumped components at the center frequencies of the 6 MHz instantaneous bandwidth associated with each of the channels two through six are tabulated in Table I.

TABLE I

| | $L_1$ ($\mu h$) | $L_2$ ($\mu h$) | $C_1$ (pf) | $C_2$ (pf) | $C_3$ (pf) |
|---|---|---|---|---|---|
| Channel 2 (fo = 57 MHz) | 0.0252 | 0.045 | 154 | 69 | 125.2 |
| Channel 3 (fo — 63 MHz) | 0.0196 | 0.037 | 131 | 61.5 | 126.8 |
| Channel 4 (fo = 69 MHz) | 0.0155 | 0.031 | 103 | 55 | 127.5 |
| Channel 5 (fo — 79 MHz) | 0.0110 | 0.025 | 50 | 47.5 | 121.6 |
| Channel 6 (fo — 85 MHz) | 0.0074 | 0.020 | 29.2 | 44.3 | 136 | where the values of inductance are given in microhenries ($\mu h$) and the value of capacitance in picofarads (pf) and $f_0$ is the center frequency of the six MHz instantaneous bandwidth associated with each of the channels two through six. It should be understood that while Table I shows five separate values for inductor $L_1$, which is formed from a metal strap, it may not be possible to cut the strap so accurately as to obtain these five separate values. Accordingly in practice, approximate values of inductor $L_1$ may be used with satisfactory operation. Thus, from a manufacturer's stand-point, only two preformed inductors 18 ($L_1$) need be provided to arrange the circuit to cover any selected one of the five possible channels. The first such preformed strap having an inductance in microhenries interpolated from that shown in Table I for channels two and three (e.g., 0.0220 $\mu h$) and the second strap having an inductance in microhenries interpolated from the values shown in the table for channels four and six (e.g. 0.0115 μh). Thus, the first strap would be used when the circuit is to be tuned for channels two and three, whereas the second strap would be used when the circuit is to be tuned for channels four, five, and six. The use of two such straps may necessitate a change in the value of capacitance for capacitors $C_1$, $C_2$, and $C_3$ from those shown in Table I. In addition, each of the capacitors also contains some inductance and resistance. Therefore, it may be necessary to adjust these capacitors to have values which are slightly different from those shown in the table. For inductor $L_2$ the change of value as shown in Table I requires for each band that the inductor be adjusted to the required inductance by adjusting a tap as shown.

An input circuit having an effective Q of two or greater is required in order to maintain a sinusoidal wave shape. The primary and secondary circuits are arranged to provide Qs having respective values in excess of two and are substantially equal in order to achieve symmetrical response. The effective Q ($Q_{eff}$) of the double tuned input circuit is tabulated in Table II. In addition, the upper and lower bandwidths for the circuit at each of the five television channels as measured between the halfpower, viz., the three db points and the frequency at which the primary tuned circuit of inductor 12 and capacitor 14 is resonant are also tabulated in Table II.

TABLE II

|  | CHANNEL | | | | |
|---|---|---|---|---|---|
|  | 2 | 3 | 4 | 5 | 6 |
| Qeff | 2.43 | 2.60 | 2.82 | 3.10 | 3.59 |
| Lower BW (MHz) | 11.2 | 11.2 | 11.2 | 11.7 | 11.2 |
| Upper BW (MHz) | 12.3 | 13.0 | 13.3 | 13.8 | 12.5 |
| $L_2C_3$ Resonant Freq. (MHz) | 67.1 | 73.5 | 80.1 | 91.3 | 96.5 |

The lower and upper bandwidths in MHz represent in Table II the difference respectively between the center frequency for each of the channels and the lower and upper 3DB points.

At some frequencies within the 54 to 88 MHz band an undesirable coaxial resonance can occur in the "shunt cavity" formed between coaxial members 26 and 28. Coaxial cavity 27 forms a shunt admittance across the desired control grid cathode path formed by coaxial line 25. The "shunt cavity" 27 can cause serious detuning effects of the input circuit if not tuned properly. In order to avoid the consequences of the detuning effects associated with cavity 27, an RF bypass capacitor 30 is placed in the grid-screen coaxial cavity 27. The position of this capacitor 30 is chosen to parallel resonate the "shunt cavity" at approximately mid point in the 54 to 88 MHz band. Capacitor 30 is preferably a combination of eight disc capacitors each having a value preferably of 0.015 microfarads and rated at 1,000 volts dc forming thereby a total capacitance of 0.120 microfarads.

In the typical tube used in this circuit, the screen grid 46 is operated at 1200 volts dc. It therefore becomes necessary to keep this screen grid voltage from being shorted to ground. Capacitor ($C_5$), physically located in coaxial cavity 27, accomplishes this end.

Figure 3:
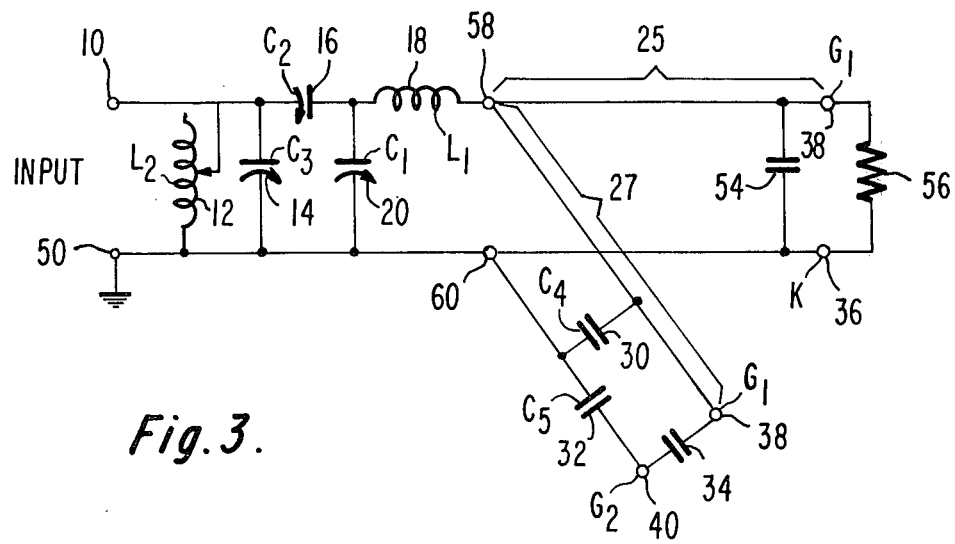
FIG. 3 is a schematic of the equivalent electrical circuit of the system of FIG. 1.

Reference is made to FIG. 3 illustrating the equivalent circuit of the system illustrated in FIG. 1. An input signal from the previous amplifier stage is coupled via input 10 and ground 50 across the inductor $L_2$ and capacitor $C_3$ in shunt to form the primary resonant circuit. Capacitor $C_2$ provides a coupling to the lumped inductor $L_1$ along the control grid line and in shunt therewith is lumped capacitor $C_1$. The coaxial line 25 extending from inductor $L_1$ and capacitor $C_1$ terminates at the cathode (K) and the control grid ($G_1$) via contacts 36 and 38, respectively. The interelectrode capacitance 54 is shown across these two terminals. A resistor 56 serves to terminate the line and is representative of the tube input beam resistance which is the control grid driving voltage divided by the plate current. The beam resistance is in the order of 20 ohms. The branch of the circuit coupled to the control grid $G_1$ (44) and the screen grid $G_2$ (46) connects to the circuit at the junction identified by points 58 and 60. The series capacitor 32 ($C_5$) is shown in series in the screen grid (46) line and capacitor 30 ($C_4$) is shown in shunt therewith. Capacitor 34 is in shunt across grid 44 and screen grid 46.

A coaxial extension as shown in FIG. 1 was constructed and had the following dimensions and physical characteristics:

L = 42.65 inches
$l_1$ = 2.75 inches
$l_2$ = 39.90 inches
$l_3$ = 38.0 inches

Coaxial member 24 is $2\frac{5}{8}$ inches O.D. with a 0.065 inch wall and characteristic impedance of 12.2 ohms over its entire length with the exception of the 2.75 inches ($l_1$) closest to the cathode contact 36 where the O.D. increases to 3 inches and the characteristic impedance is seven ohms. Coaxial member 26 is 3.50 inches O.D. with a 0.065 wall coaxial member 28 is a square line with a $4\frac{3}{4}$ inch square I.D. and a 4.5 inch O.D. with a 1/16 inch wall.

The step in coaxial member 24 was used in the present embodiment to provide space for the filament structure of the tube 52. Such a step would not be needed, of course, if the tube selected for practicing the invention allowed for smaller filament structure. Nevertheless, it will be understood that the design of the coaxial transmission line system will follow the principles described above.

According to the invention, there is provided an input circuit system that uses the same reactive components in the same circuit configuration for all five television channels in the 54 to 88 MHz band. However, the values of each of the components comprising the circuit are changed for each selected channel of the five channels in the low VHF band.

What is claimed is:

1. An input circuit for a very high frequency low band television amplifier, said circuit being tunable over the bandwidth of each television channel in said low band, said channel bandwidth having a center frequency, comprising:
   a. an electron tube having at least a cathode, a control grid, and a screen grid,
   b. a coaxial transmission line system having first, second and third concentric members, one end of said first member being conductively coupled to said cathode and the opposite end coupled to ground, one end of said second member being conductively coupled to said control grid, one end of said third member being coupled to said screen grid and the opposite end of said third member being conductively coupled to ground, said first and second members defining a first coaxial transmission line cavity along the length of said second member, said second and third members closely spaced from each other over a portion defining a second coaxial transmission line cavity, c. a tunable input circuit means comprising a primary lumped component circuit and a secondary circuit, said primary and secondary circuit being over coupled to each other by capacitive means, said primary circuit comprising adjustable inductive and capacitive reactances in shunt, said secondary circuit comprising a network formed by said first and second coaxial transmission line cavities in parallel, a lumped series inductance connected to the other free end of said second member and a secondary tuning capacitor, d. said first member having a physical coaxial length from said cathode to a point opposite the other free end of said second member such that the electrical length is greater than one-quarter wavelength and less than one-half wavelength at said low band, e. said primary circuit means being tuned to a frequency above said center frequency, said secondary circuit means being tuned to a frequency below said center frequency such that said input circuit has a voltage standing wave ratio of no greater than 1.2:1 over the bandwidth of each of said television channels.

2. An input circuit according to claim 1 wherein the finite admittance of said tube at said electrode is capacitive, and said first coaxial line system transforms said capacitive admittance to an inductive admittance.

3. The combination claimed in claim 1, including a capacitance connected between said second and third members at a predetermined distance from the termination of the second coaxial transmission line cavity.

4. An input circuit for a very high frequency low band television linear amplifier comprising:

a. an electron tube having at least a cathode, a control grid and a screen grid, b. a transmission line means having first, second, and third coaxial members one end of said first member coupled to said cathode, one end of said second member coupled to said control grid, one end of said third member coupled to said screen grid, and the other end of said third member coupled to ground, c. a double tuned circuit means including the other ends of said first and second members of said transmission line, the length of the portion of said first member from said cathode to the other end of said second member is determined such that the electrical length is greater than a quarter wavelength ($>\lambda/4$) and less than a half wavelength ($<\lambda/2$) over said low band, and a capacitance connected between said second and third members at a predetermined distance from said control grid such that the cavity formed by said members is parallel resonated at a frequency which is substantially the mid point of said low band.

* * * * *